(12) United States Patent
Niwa et al.

(10) Patent No.: US 8,397,503 B2
(45) Date of Patent: Mar. 19, 2013

(54) TURBOCHARGED ENGINE FOR VEHICLE

(75) Inventors: Yasushi Niwa, Hiroshima (JP); Atsuhiro Hatabu, Hiroshima (JP); Takashi Sasada, Hiroshima (JP); Eiji Nakai, Hiroshima (JP)

(73) Assignee: Mazda Motor Corporation (JP)

( * ) Notice: Subject to any disclaimer, the term of this patent is extended or adjusted under 35 U.S.C. 154(b) by 442 days.

(21) Appl. No.: 12/774,499

(22) Filed: May 5, 2010

(65) Prior Publication Data

US 2010/0313561 A1 Dec. 16, 2010

(30) Foreign Application Priority Data

Jun. 12, 2009 (JP) ................. 2009-141625

(51) Int. Cl.
*F02B 33/44* (2006.01)
(52) U.S. Cl. ............... 60/612; 60/624; 60/597; 60/272; 123/562
(58) Field of Classification Search .............. 60/612, 60/624, 597, 272; 123/562
See application file for complete search history.

(56) References Cited

U.S. PATENT DOCUMENTS 8,011,186 B2 * 9/2011 McEwan et al. ............ 60/612

FOREIGN PATENT DOCUMENTS

| FR | 2 922 595 A1 | 4/2009 |
|----|----|----|
| JP | S59-211718 A | 11/1984 |
| JP | 2005-133651 A | 5/2005 |
| JP | 2006-070878 A | 3/2006 |
| JP | 2006-70878 A | 3/2006 |
| JP | 2008-248814 A | 10/2008 |
| WO | WO 2008015397 A1 * | 2/2008 |

OTHER PUBLICATIONS

The Extended European Search Report dated Sep. 29, 2010; Application No. 10005277.8-2311.

* cited by examiner

*Primary Examiner* — Ching Chang
(74) *Attorney, Agent, or Firm* — Studebaker & Brackett PC; Donald R. Studebaker (57) ABSTRACT

Two turbochargers are arranged vertically near a one side of a crank-shaft direction at a one-side face of an engine body so that the large-size turbocharger is located above the small-sized turbocharger, and an exhaust-gas purification device is arranged an open space made on the other side of the crank-shaft direction so that its exhaust inlet is located above and its outlet is located below. Accordingly, the turbochargers and the exhaust-gas purification device can be arranged compactly and the layout of some devices around the engine can be facilitated.

8 Claims, 6 Drawing Sheets

TURBOCHARGED ENGINE FOR VEHICLE

BACKGROUND OF THE INVENTION

The present invention relates to a turbocharged engine for a vehicle.

A turbocharged engine for a vehicle, in which a small-sized turbocharger, a large-sized turbocharger, and an exhaust-gas purification device are supported at an engine body, is known. Japanese Patent Laid-Open Publication No. 2006-70878, for example, discloses an engine which is arranged laterally so that its crank-shaft direction matches an axel direction of the vehicle, in which the small-sized turbocharger, the large-sized turbocharger, and a DPF (Diesel Particulate Filter) are arranged in back of the engine body in a vehicle longitudinal direction.

In the engine disclosed in the above-described publication, the large-sized turbocharger and DPF are arranged laterally so that their respective axial lines extend in the crank-shaft direction, and arranged almost at the same height position so that they are located side by side in the axial direction on a one-side face of the engine body. Herein, an outlet of a turbine is directly connected to an exhaust inlet of the DPF. The small-sized turbocharger is arranged laterally so that its axial line extends in the crank-shaft direction, and it is located above the DPF (further above the large-sized turbocharger).

An exhaust manifold has two exhaust outlets, and one of them is connected to a turbine of the small-sized turbocharger and the other is connected to a turbine of the large-sized turbocharger via a bypass passage, bypassing the small-sized turbocharger. An exhaust pipe which connects to an outlet of the turbine of the small-sized turbocharger extends upward and then bends downward toward the large-sized turbocharger, and finally connects to the above-described bypass passage.

In case of the above-described turbocharged engine, since the both turbochargers are arranged near the engine body, the loss of exhaust energy is so small that the supercharging function improves. Further, since the DPF is directly connected to the outlet of the turbine of the large-sized turbocharger, the high-temperature exhaust gas is supplied to the DPF so that the regeneration of filter improves.

Herein, while the direct-connection arrangement of the large-sized turbocharger and the DPF, as an exhaust-gas purification device, arranged laterally side by side in the crank-shaft direction has the above-described advantages, in case the size of the exhaust-gas purification device becomes larger, the whole length of the large-sized turbocharger and the DPF in the crank-shaft direction becomes longer, so that both ends of these devices may project greatly from both ends of the engine body. This would cause difficulties in layouts of engine devices, such as a cooling-water pump or alternator, layouts of piping of an air cleaner, intercooler, EGR system and buttery and the like, and in layouts of a master back of a vehicle brake.

SUMMARY OF THE INVENTION

An object of the present invention is to provide a turbocharged engine for a vehicle which can provide a properly compact arrangement of the large-sized turbocharger, small-sized turbocharger, exhaust-gas purification device and intake and exhaust pipes on a one-side face of the engine body even in case the size of the exhaust-gas purification device is large.

According to the present invention, there is provided a turbocharged engine for a vehicle, comprising a small-sized turbocharger, a turbine of which is connected to an outlet of an exhaust manifold provided on a one-side face of an engine body, a large-sized turbocharger, a turbine of which is connected to an outlet of the turbine of the small-sized turbocharger, and an exhaust-gas purification device connected to an outlet of the turbine of the large-sized turbocharger, wherein the small-sized turbocharger is arranged near one side of a crank-shaft direction at the one-side face of the engine body, the large-sized turbocharger is arranged above the small-sized turbocharger near the one side of the crank-shaft direction at the one-side face of the engine body so that the outlet of the turbine thereof faces toward the other side of the crank-shaft direction, the exhaust-gas purification device is arranged vertically on the other side of the crank-shaft direction, which is opposite to the one side of the crank-shaft direction, relative to the small-sized turbocharger and large-sized turbocharger at the one-side face of the engine body so that an exhaust outlet thereof is located above and an exhaust outlet thereof is located below, and the exhaust inlet of the exhaust-gas purification device is connected to the outlet of the turbine of the large-sized turbocharger and the exhaust outlet of the exhaust-gas purification device is connected to an exhaust pipe.

According to the present invention, since the large-sized turbocharger and the small-sized turbocharger are arranged near the one side of the crank-shaft direction at the one-side face of the engine body, and the exhaust-gas purification device is arranged in an open space made on the opposite side of the crank-shaft direction, even in case the size of the exhaust-gas purification device is large, the both turbochargers and the exhaust-gas purification device can be arranged compactly without projecting from the both ends of the engine body greatly. Accordingly, the flexibility of layout of the engine devices or any devices located in the engine room can improve.

Further, since the large-sized turbocharger is arranged above the small-sized turbocharger so that the outlet of the turbine thereof faces toward the exhaust-gas purification device, the outlet of the turbine and the exhaust outlet of the exhaust-gas purification device can be connected with the shortest distance. Moreover, since the both turbochargers are arranged near the one side of the crank-shaft direction, intake and exhaust passages which connect the respective turbines or compressors of these turbochargers can be made short as well. Thus, not only the weight of pipes forming these passages but the amount of thermal expansion of the pipes may be properly reduced. Thereby, the structure of the pipes can be simplified by reducing the number of flexible pipes used, and the support of these turbochargers and the exhaust-gas purification device at the engine body can be facilitated.

According to an embodiment of the present invention, a master back of a brake device and the engine body are arranged in an engine room in front of a vehicle compartment of the vehicle, the engine body is arranged laterally so that the crank-shaft direction matches an axel direction of the vehicle, the small-sized turbocharger, large-sized turbocharger and exhaust-gas purification device are located in back of the engine body in a vehicle longitudinal direction, and the master back is arranged behind the engine body on the side of the small-sized turbocharger and large-sized turbocharger in the crank-shaft direction. In general, in case of the laterally-arranged engine, the engine body occupies a rather wide space inside the engine room in the axel direction of the vehicle, so it may be necessary to arrange some devices located behind the engine body so as not to extend greatly in the axel direction, avoiding any interference of these devices with the master back of the brake device. According to the present embodiment, however, since the both turbochargers are arranged near the one side of the crank-shaft direction at the one-side face of the engine body and the exhaust-gas purification device is arranged in the open space on the opposite side of the crank-shaft direction, it can be avoided that these devices project greatly from the both ends of the engine body in the crank-shaft direction, and the layout of the master back can be facilitated.

According to another embodiment of the present invention, a master back of a brake device and the engine body are arranged in an engine room in front of a vehicle compartment of the vehicle, the engine body is arranged laterally so that the crank-shaft direction matches an axel direction of the vehicle, the small-sized turbocharger, large-sized turbocharger and exhaust-gas purification device are located in back of the engine body in a vehicle longitudinal direction, and the master back is arranged behind the engine body on the side of the exhaust-gas purification device in the crank-shaft direction. Thereby, since the exhaust-gas purification device is arranged vertically so that its exhaust inlet is located above and its exhaust outlet is located below, the exhaust pipe connecting to its exhaust outlet can be made easily pass through the saddle-shaped exhaust-pipe storage at the floor front portion of the vehicle, without improperly bending in the engine room, which should be advantageous in reducing the exhaust resistance.

According to another embodiment of the present invention, there are provided a first bypass passage which introduces exhaust gas from the outlet of the exhaust manifold to the large-sized turbocharger, bypassing the small-sized turbocharger, and a second bypass passage which introduces exhaust gas to the exhaust-gas purification device, bypassing the large-sized turbocharger, and valves are respectively provided in the first and second bypass passages, the valves opening the respective bypass passages when a temperature of the exhaust-gas purification device does not reach a specified active temperature capable to purify the exhaust gas. Thereby, since the both bypass passages are opened when the exhaust-gas purification device has not been activated yet, the exhaust gas from the exhaust manifold flows into the exhaust-gas purification device directly maintaining its high temperature, without being cooled down by the both turbochargers, which should be advantageous in activating the exhaust-gas purification device quickly.

According to another embodiment of the present invention, the small-sized turbocharger and the large-sized turbocharger are located so that the outlet of the exhaust manifold is positioned between the turbochargers, and a bifurcate exhaust-pipe portion extends from the outlet of the exhaust manifold so that a lower pipe-portion thereof connects to the small-sized turbocharger and an upper-pipe portion thereof connects to the large-sized turbocharger, the upper-pipe portion constituting the first bypass passage. Thereby, the length of the first bypass passage can be shortened, so that the amount of heat of the exhaust gas which may get away before the exhaust gas reaches the exhaust-gas purification device can be reduced, which should be advantageous in activating the exhaust-gas purification device quickly.

Other features, aspects, and advantages of the present invention will become apparent from the following description which refers to the accompanying drawings.

DETAILED DESCRIPTION OF THE INVENTION

Hereinafter, a preferred embodiment of the present invention will be described referring to the accompanying drawings. Herein, the preferred embodiment is merely an example of the present invention, and the present invention should not be limited to the embodiment in its application.

Figure 1:
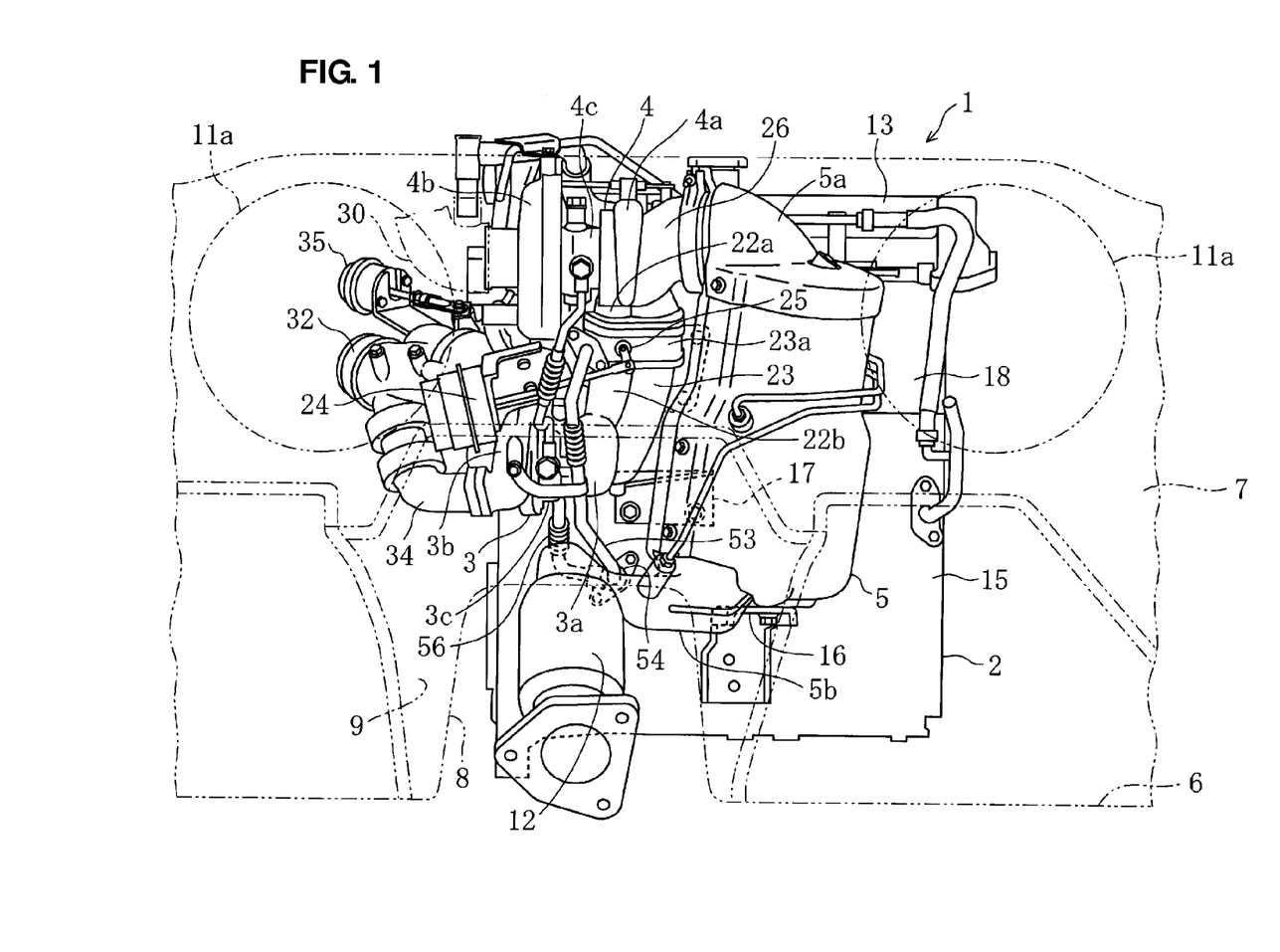
FIG. 1 is an elevational view (viewed from a vehicle rear side) of a turbocharged engine according to an embodiment of the present invention.

FIG. 1 is a view of a turbocharged engine 1 for a vehicle, when viewed from a rear side in a vehicle longitudinal direction. An engine body 2 is arranged laterally so that its crank-shaft direction matches an axel direction of the vehicle. A small-sized turbocharger 3, a large-sized turbocharger 4, and an exhaust-gas purification device 5 are arranged on a one-side face of a rear side of the engine body 2 in the vehicle longitudinal direction.

Figure 2:
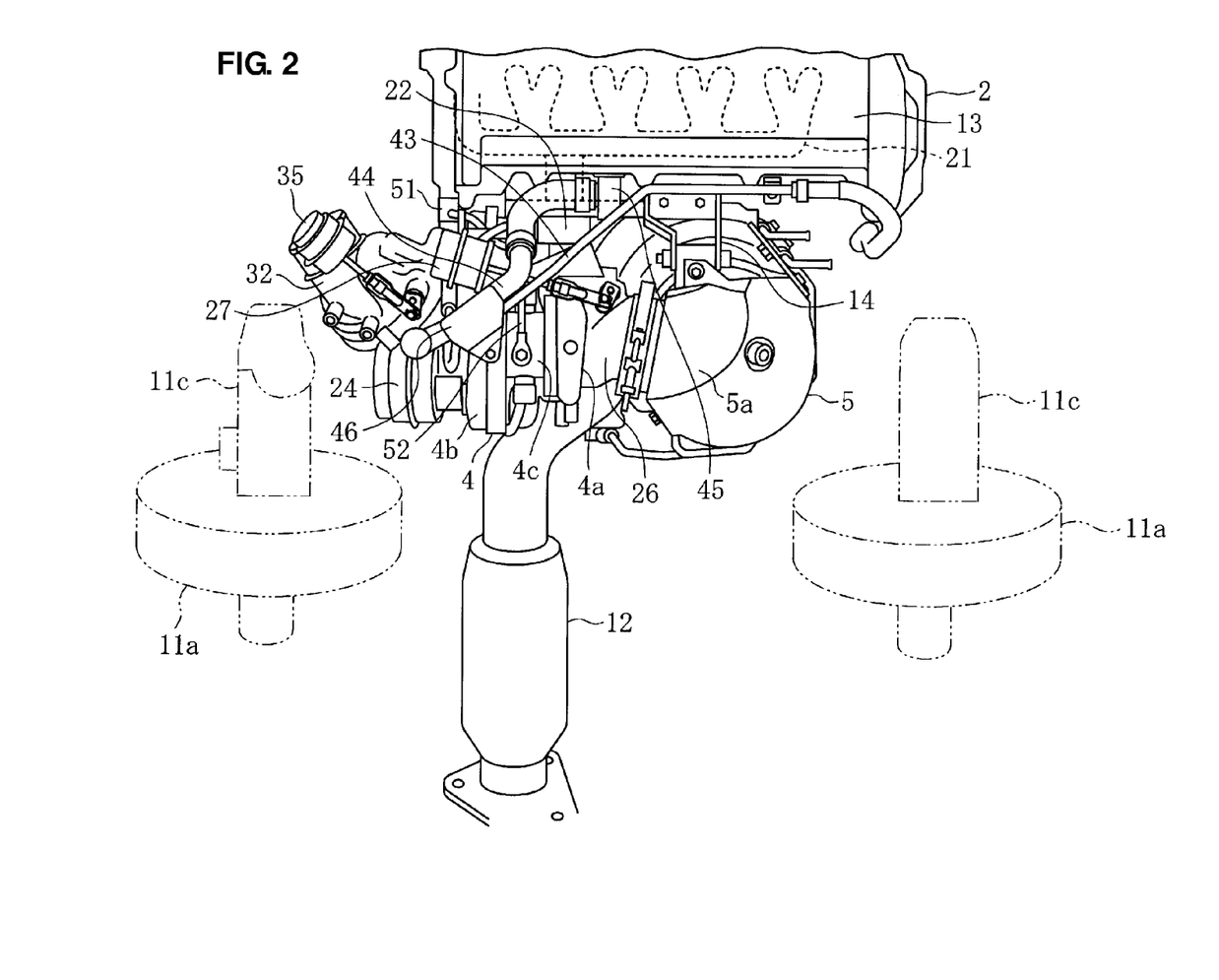
FIG. 2 is a plan view of the engine.

In this figure, reference numeral 6 denotes a floor panel and reference numeral 7 denotes a dash panel which partitions a vehicle compartment from an engine room. A floor tunnel member 8 is provided at a central portion of the floor panel 6 so as to extend in the longitudinal direction, and this floor tunnel member 8 forms a saddle-shaped exhaust-pipe storage 9 at a front end of a front portion of a vehicle floor, a front end of which opens in the engine room. A master back 11*a* of a brake device of the vehicle is attached to a dash panel 7. In FIGS. 1 and 2, the left-side master back 11*a* is for a vehicle with a left-side steering wheel, and the right-side master back 11*a* is for a vehicle with a right-side steering wheel.

[Arrangement/Support Structure of Turbochargers and Exhaust-Gas Purification Device]

Hereinafter, the arrangement of the turbochargers 3, 4 and exhaust-gas purification device 5 will be described. The small-sized turbocharger 3 is arranged near one side of a crank-shaft direction at a side face of the engine body 2. Likewise, the large-sized turbocharger 4 is arranged above the small-sized turbocharger 2 near the one side of the crank-shaft direction at the side face of the engine body 2. These turbochargers 3, 4 are arranged laterally so that their axial shafts extend in the crank-shaft direction and respective outlets of their turbines 3*a*, 4*a* face toward the other side of the crank-shaft direction.

Figure 3:
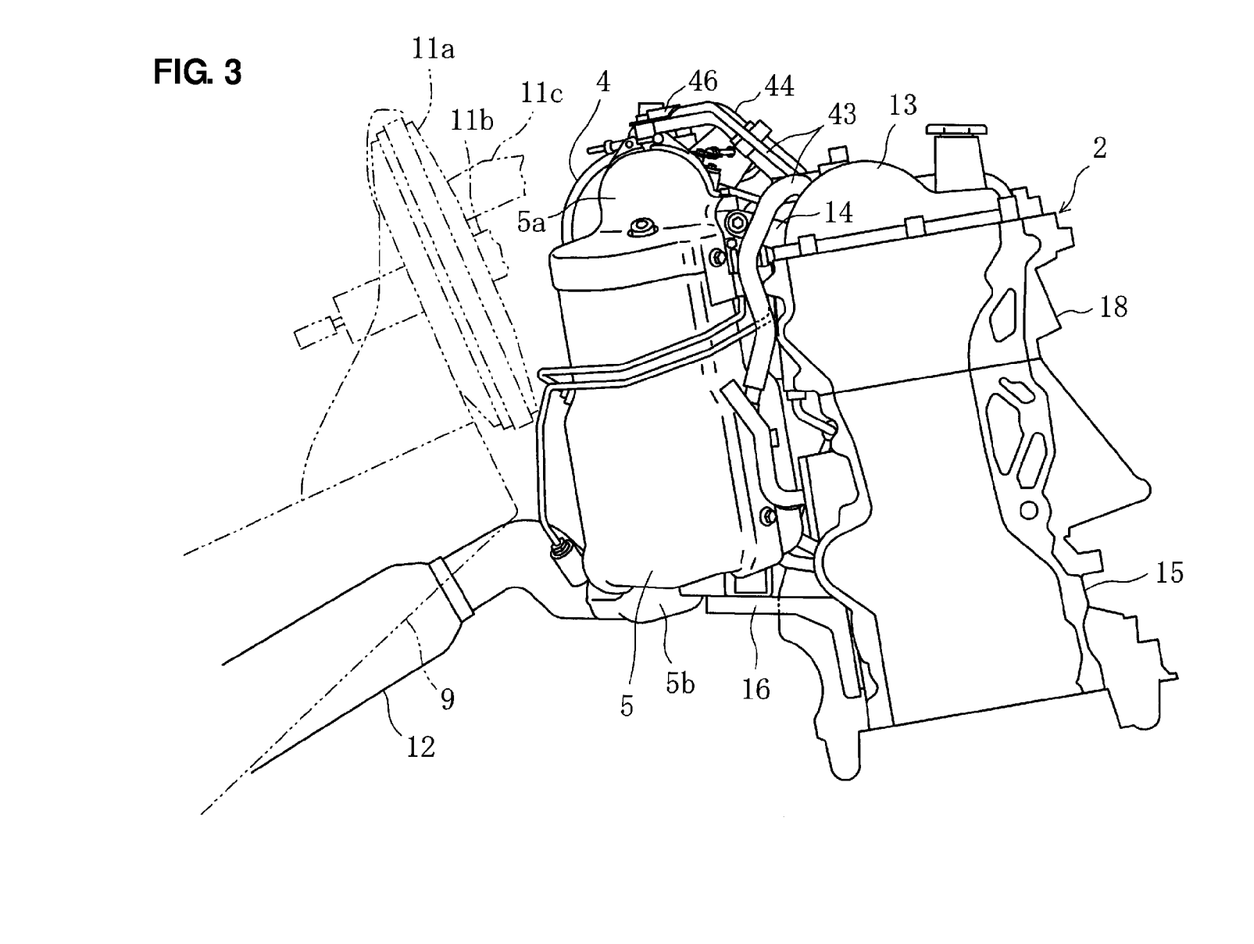
FIG. 3 is a right side view of the engine.

The exhaust-gas purification device 5 is arranged vertically on the other side of the crank-shaft direction, which is opposite to the above-described one side of the crank-shaft direction, relative to the turbochargers 3, 4 at the one-side face of the engine body so that its exhaust outlet is located above and its exhaust outlet is located below. This exhaust-gas purification device 5 comprises a container, and an oxidization catalyst located above (upstream) and a DPF located below (downstream) which are contained in the container. As shown in FIG. 3, an outlet pipe portion 5*b* of a lower side of the exhaust-gas purification device 5 is connected to a downstream-side exhaust pipe 12 which is stored in the saddle-shaped exhaust-pipe storage 9.

Next, the support structure of the turbochargers 3, 4 and the exhaust-gas purification device 5 will be described. The exhaust-gas purification device 5 is supported so that its upper end portion is supported at an upper bracket 14 which projects toward the side from a cylinder head cover 13 as shown in FIGS. 2 and 3, and its lower end portion is supported at a lower bracket 16 which projects toward the side from a cylinder block 15 as shown in FIGS. 1 and 3. A support shaft is provided at the upper bracket 14 so as to extend in the crankshaft direction, and an upper end portion of the exhaust-gas purification device 5 is supported at the support shaft. The exhaust-gas purification device 5 is received by the lower bracket 16 so that its lower face is fixed to the lower bracket 16. When its fixing to the lower bracket 16 is released, a lower portion of the exhaust-gas purification device 5 is allowed to rotate longitudinally around the support shaft of eh upper bracket 14.

Figure 4:
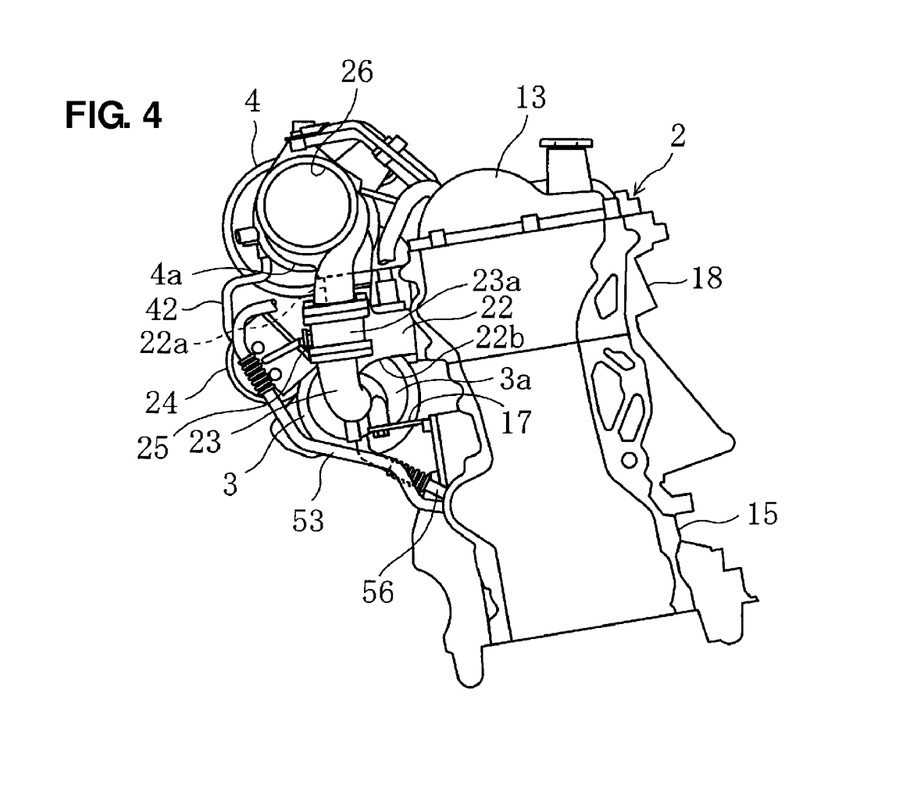
FIG. 4 is a right side view of the engine, without showing part of cooling-water and oil pipes and an exhaust purification device.

The both turbochargers 3, 4 are connected via intake and exhaust pipes which will be described, and as shown in FIGS. 1 and 4, the lower-side small-sized turbocharger 3 is supported at a bracket 17 which projects toward the side from the cylinder block 15. Further, the turbochargers 3, 4 are supported at a cylinder head 18 shown in FIG. 4 via an upstream-side exhaust pipe 22.

[Structure of Intake and Exhaust Systems]

The exhaust system will be described. As shown in FIG. 2, an exhaust manifold 21 which gathers exhaust gas from exhaust ports of respective cylinders of the engine is integrally formed with the engine body 2.

The upstream-side exhaust pipe 22 is connected to an outlet of the exhaust manifold of the cylinder head 18 as shown in FIG. 4. The small-sized turbocharger 3 and the large-sized turbocharger 4 are arranged below and above the exhaust-manifold outlet, respectively. The upstream-side exhaust pipe 22 bifurcates vertically. An upper bifurcate portion 22a is connected to an inlet of the turbine 4a of the large-sized turbocharger 4. A lower bifurcate portion 22b is connected to an inlet of the turbine 3a of the small-sized turbocharger 3.

The outlet of the turbine 3a of the small-sized turbocharger 3 and the inlet of the turbine 4a of the large-sized turbocharger 4 are connected via a turbine connection pipe 23 so as to have the exhaust gas from the small-sized turbocharger 3 flow into the large-sized turbocharger 4. The turbine connection pipe 23 includes a flexible pipe 23a which can absorb the thermal expansion/contraction at its middle portion.

The upper bifurcate portion 22a of the upstream-side exhaust pipe 22 forms a first bypass passage which bypasses the turbine 3a of the small-sized turbocharger 3 to have the exhaust gas into the large-sized turbocharger 4, and comprises a regulating valve (reference numeral 25 in FIG. 6) which is driven by an actuator 24 shown in FIG. 1. The upper bifurcate portion 22a and the turbine connection pipe 23 gather together and are connected to the inlet of the turbine 4a of the large-sized turbocharger 4.

A turbine downstream pipe 26 extends toward the side from the outlet of the turbine 4a of the large-sized turbocharger 4, and is connected to an inlet pipe portion 5a of the exhaust-gas purification device 5. Further, there is provided a bifurcate passage (second bypass passage) which bypasses the turbine 4a of the large-sized turbocharger 4 and introduces the exhaust gas from a connection portion of the upper bifurcate portion 22a and the turbine connection pipe 23 into the turbine downstream pipe 26. A waste gate valve (reference numeral 28 in FIG. 6), which is driven by an actuator 27 shown in FIG. 2, is provided at this bifurcate portion.

Next, the intake system will be described. As shown in FIG. 1, an intake pipe 30 which extends from an air cleaner (not illustrated) is connected to an inlet of a compressor 4b of the large-sized turbocharger 4. An outlet of the compressor 4b of the large-sized turbocharger 4 and an inlet of the compressor 3b of the small-sized turbocharger 3 are connected by a compressor connection pipe 31 shown in FIG. 5 to have the intake air from the large-sized turbocharger 4 flow into the small-sized turbocharger 3.

The compressor connection pipe 31 bifurcates at its middle portion to form an intake supply pipe 32, which supplies the intake air to the engine body 2 via an intercooler (not illustrated). This intake supply pipe 32 has an intake cut valve (reference numeral 33 in FIG. 6) therein, which is driven by an actuator 35 shown in FIG. 2 and others. As shown in FIG. 1, a compressor downstream pipe 34 is connected to an outlet of the compressor 3b of the small-sized turbocharger 3. This compressor downstream pipe 34 is connected to the intake supply pipe 32 at a position downstream of the intake cut valve 33 so as to supply the intake air to the intercooler.

Figure 6:
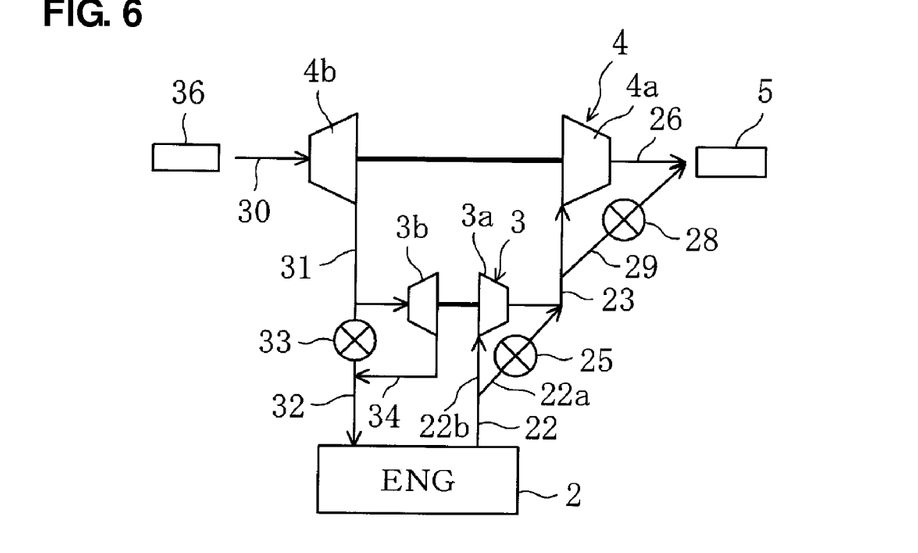
FIG. 6 is a diagram showing schematically intake and exhaust systems of turbochargers of the engine.

FIG. 6 shows schematically the structure of the above-described intake and exhaust system. The upstream-side exhaust pipe 22 extending from the engine body 2 bifurcates at its middle portion, and one of them (lower bifurcate portion 22b) connects to the turbine 3a of the small-sized turbocharger 3 and the other (upper bifurcate portion 22a) connects to the turbine connection pipe 23 which connects the turbines of the turbochargers 3, 4. This upper bifurcate portion 22a constitutes the first bypass passage including the regulating valve 25. A second bypass passage 29 including the waste gate valve 28 extends from the turbine connection pipe 23 to the turbine downstream pipe 26 of the large-sized turbocharger 4.

The intake pipe 30 extending from the air cleaner 36 is connected to the compressor 4b of the large-sized turbocharger 4, this compressor 4b and the compressor 3b of the small-sized turbocharger 3 are connected via the compressor connection pipe 31, and the intake cut valve 33 is provided in the intake supply pipe 32. The compressor downstream pipe 34 extending from the outlet of the compressor 3b of the small-sized turbocharger 3 is connected to the intake supply pipe 32 at a position downstream of the intake cut valve 33.

In this case, when the engine driving condition is in a low or middle speed driving area, the intake cut valve 33 and the waste gate valve 28 are closed, and the supercharging pressure is set at a target supercharging pressure by an opening control of the first bypass passage 22a with the regulating valve 25. When the engine driving condition is in a high speed driving area of the engine, the intake cut valve 33 and the regulating valve 25 are opened, and the supercharging pressure is set at the target supercharging pressure by an opening control of the second bypass passage 29 with the waste gate valve 28. Further, when the temperature of the oxidization catalyst of the exhaust-gas purification device 5 has noted reach the specified active temperature yet, the intake cut valve 33 and the waste gate valve 28 are opened, so that the exhaust gas from the exhaust manifold 21 flows into the exhaust-gas purification device 5 via the first and second bypass passages 22a, 29. Thereby, the oxidization catalyst can be activated quickly by the high-temperature exhaust gas which is not cooled down by the turbochargers 3, 4.

[Piping of Cooling Water and Oil]

Figure 7:
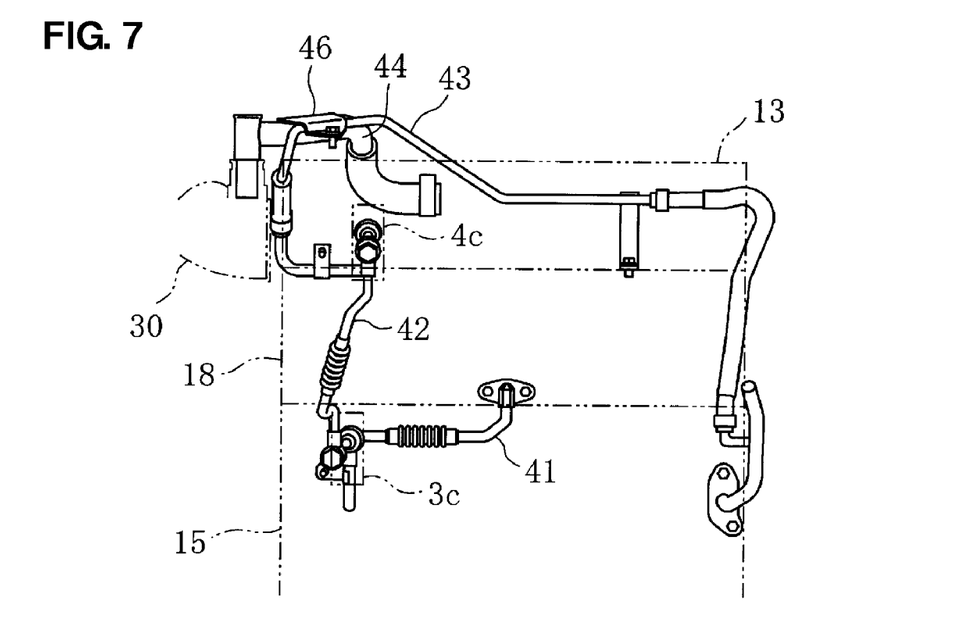
FIG. 7 is an elevational view showing the cooling-water pipe of the turbochargers of the engine.

The cooling-water piping of the turbochargers 3, 4 will be described. As shown in FIG. 7, a cooling-water supply pipe 41 extends from the cylinder head 18 of the engine body 2 to a center housing 3c of the small-sized turbocharger 3, and the center housing 3c is cooled by the cooling water. A cooling-water supply pipe 42 which extends upward from the center housing 3c of the small-sized turbocharger 3 is connected to a center housing 4c of the large-sized turbocharger 4 (see FIGS. 1 and 8), and the center housing 4c is cooled by the cooling water which has passed the center housing 3c of the small-sized turbocharger 3.

Figure 8:
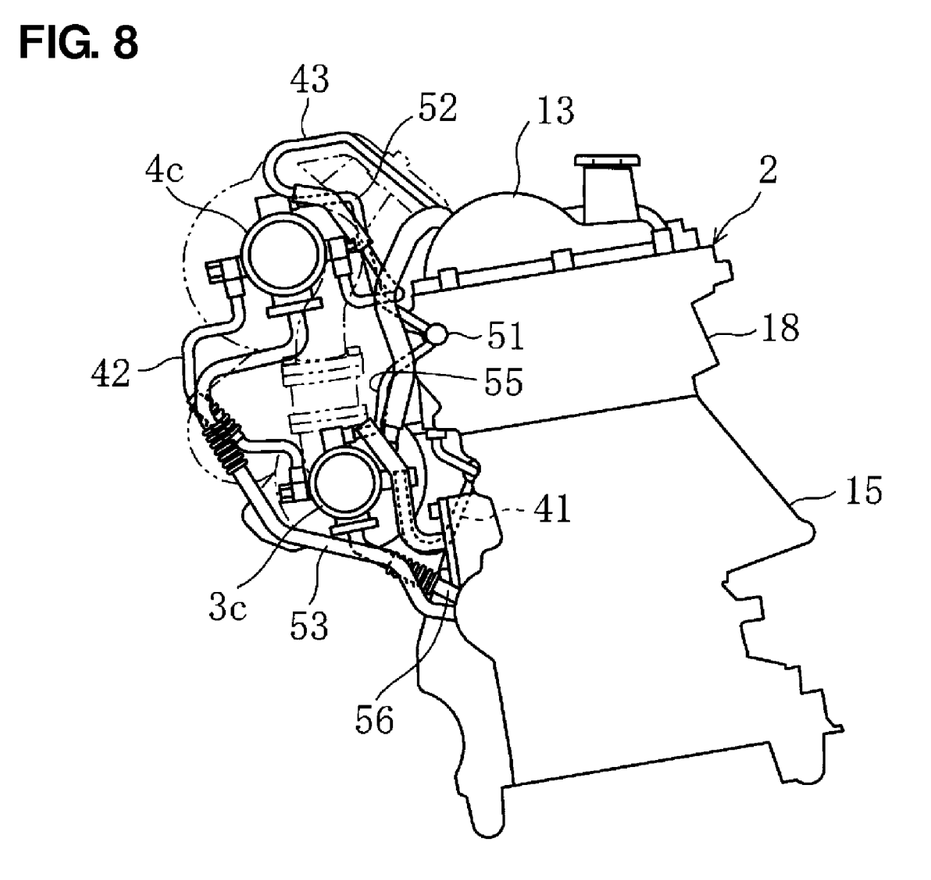
FIG. 8 is a right side view showing the cooling-water and oil pipes of the turbochargers of the engine.

A cooling-water return pipe 43 which returns the cooling water to the cylinder block 15 extends from the center housing 4c of the large-sized turbocharger 4. As shown in FIG. 8, this cooling-water return pipe 43 bends downward once and then upward, and extends along a blowby-gas pipe 44 shown in FIGS. 1 and 2 on the one side of the crank-shaft direction and then extends toward the other end of the crank-shaft direction and connects to the cylinder block 15. The blowby-gas pipe 44 for returning the blowby gas to the intake side is connected to a gas pipe 45 which projects from the cylinder head cover 13 at its one end and connected to the intake supply pipe 30 at the other end. Part of the cooling-water return pipe 43 extending along the blowby-gas pipe 44 is covered with a cover 46 so that these pipes 43, 44 can be held together without getting apart from each other. Herein, since the blowby-gas pipe 44 is heated by the high-temperature water in the cooling-water return pipe 43, any icing of the blowby gas can be avoided.

Figure 5:
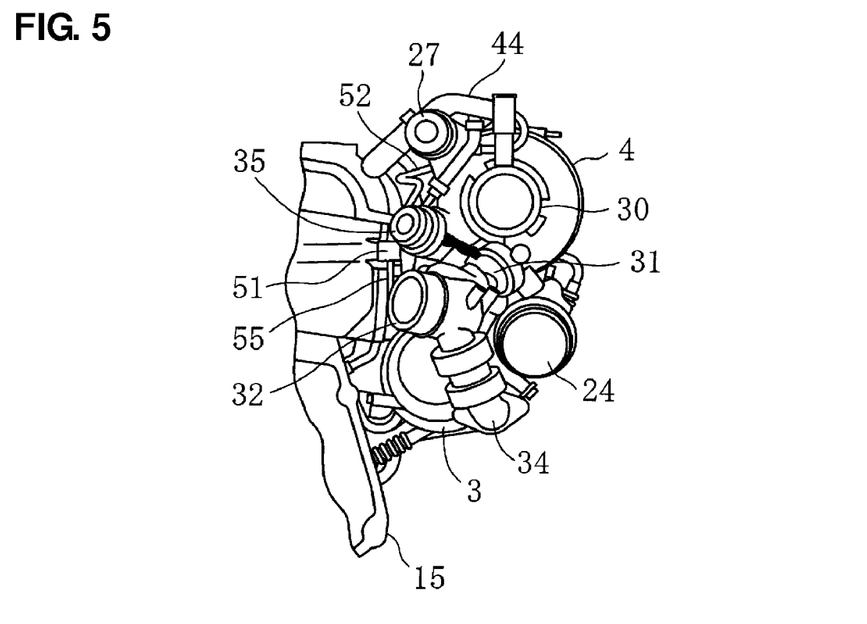
FIG. 5 is a left side view showing part of the engine.

The oil piping of the turbochargers 3, 4 will be described. As shown in FIGS. 2 and 5, an oil outlet portion 51 to take out the oil for cooling and lubricating bearings of the turbochargers 3, 4 is provided at an end portion of the cylinder head 18 on a one side of the crank-shaft direction.

As shown in FIG. 5, the oil supply pipe 52 which extends upward from the oil outlet portion 51 is connected to the upper face of the center housing 4c of the large-sized turbocharger 4 as shown in FIGS. 2 and 8. An oil return pipe 53 to return the oil from the lower face of the center housing 4c to the cylinder block 15 extends downward as shown in FIG. 8, and is connected to an oil return portion 54 of the cylinder block as shown in FIG. 1. Further, as shown in FIG. 5, an oil supply pipe 55 which extends downward from the oil outlet portion 51 is connected to the upper face of the center housing 3c of the small-sized turbocharger 3 as shown in FIG. 8. An oil return pipe 56 extends downward from the lower face of the center housing 3c, and is connected to the oil return portion 54 of the cylinder block as shown in FIG. 1.

[Effects of Embodiment]

According to the above-described embodiment, as shown in FIG. 1, the turbochargers 3, 4 are arranged vertically near the one side of the crank-shaft direction at the one-side face of the engine body 2, and the exhaust-gas purification device 5 is arranged the open space made on the other side of the crank-shaft direction. Thus, even in case the size of the exhaust-gas purification device 5 is large, the turbochargers 3, 4 and the exhaust-gas purification device 5 can be arranged compactly without projecting from the both ends of the engine body 2 greatly. Accordingly, the flexibility of layout of the engine devices such as the air cleaner, intercooler, EGR system's pipes, buttery, fuel pump or any devices located in the engine room can improve.

Especially, since the large-sized exhaust-gas purification device 5 is arranged so as not to project from the end of the engine body on the opposite side of the crank-shaft direction, any interference with devices, such as the alternator, cooling-water pump, or air-conditioning compressor, which are arranged at the opposite-side end face of the engine body can be avoided, so that the layout of these can be facilitated. Moreover, since the turbochargers 3, 4 and the exhaust-gas purification device 5 are arranged compactly without projecting from the both ends of the engine body 2 greatly, as shown in FIGS. 1 and 2, the master back 11a, a master cylinder 11b, and a reserve tank 11c of the brake device can be arranged properly for a vehicle with the left-side steering wheel or a vehicle for the right-side steering wheel even in case the engine of the vehicle is mounted laterally.

Further, the turbochargers 3, 4 are arranged vertically so as to be located below and above the outlet of the exhaust manifold, respectively, and the upstream-side exhaust pipe 22 bifurcates and the upper bifurcate portion 22a as the first bypass passage is connected to the turbine 4a of the large-sized turbocharger 4. Accordingly, the passage length of the bypass passages 22a, 29 from the exhaust-manifold outlet to the exhaust-gas purification device 5 when the regulating valve 25 and the waste gate valve 28 are opened becomes considerably short. Therefore, when the oxidization catalyst of the exhaust-gas purification device 5 has not been activated yet, the high-temperature exhaust gas can flow into the exhaust-gas purification device 5 through the bypass passages 22a, 29, which should be advantageous in activating the oxidization catalyst quickly.

Moreover, since the exhaust-gas purification device 5 is arranged vertically so that its exhaust outlet is located below and it is supported at the back face of the laterally-arranged engine body 2, the outlet pipe portion 5b can be connected to the downstream-side exhaust pipe 12 in the saddle-shaped exhaust-pipe storage 9 properly just with its bending rearward and then extending. Thus, it may not be necessary that the exhaust pipe from the exhaust-gas purification device 5 to the saddle-shaped exhaust-pipe storage 9 bends in the engine room, which should be advantageous in reducing the exhaust resistance.

The present should not be limited to the above-described embodiment, and any other modifications or improvements can be applied within the scope of a sprit of the present invention.

What is claimed is:

1. A turbocharged engine for a vehicle, comprising:
a small-sized turbocharger provided on a one-side face of an engine body, a turbine of which is connected to an outlet of an exhaust manifold;
a large-sized turbocharger provided on the one-side face of the engine body, a turbine of which is connected to an outlet of the turbine of said small-sized turbocharger; and
an exhaust-gas purification device provided on the one-side face of the engine body and connected to an outlet of the turbine of said large-sized turbocharger,
wherein said small-sized turbocharger is arranged near one side of a crank-shaft direction at said one-side face of the engine body, said large-sized turbocharger is positioned right above said small-sized turbocharger such that the large-sized turbocharger and the small-sized turbocharger are arranged up and down, overlapping with each other in the crank-shaft direction, and the outlet of the turbine of the large-sized turbocharger faces toward the other side of said crank-shaft direction, an upstream-side exhaust pipe connected to the outlet of the exhaust manifold bifurcates vertically into an upward-extending upper bifurcate portion and a downward-extending lower bifurcate portion, the upward-extending upper bifurcate portion being connected to an inlet of the turbine of the large-sized turbocharger so as to introduce exhaust gas from the engine body to the large-sized turbocharger, bypassing the turbine of the small-sized turbocharger, the downward-extending lower bifurcate portion being connected to an inlet of the turbine of the small-sized turbocharger so as to introduce the exhaust gas from the engine body to the small-sized turbocharger, said exhaust-gas purification device is arranged beside the large-sized turbocharger and the small-sized turbocharger on the other side of the crank-shaft direction, which is opposite to said one side of the crank-shaft direction, and extends vertically such that an inlet thereof is located at an upper position and an outlet thereof is located at a lower position, and the inlet of the exhaust-gas purification device is connected to the outlet of the turbine of the large-sized turbocharger and the outlet of the exhaust-gas purification device is connected to an exhaust pipe.

2. The turbocharged engine for a vehicle of claim 1, wherein a master back of a brake device and said engine body are arranged in an engine room in front of a vehicle compartment of the vehicle, the engine body is arranged laterally so that the crank-shaft direction matches an axel direction of the vehicle, said small-sized turbocharger, large-sized turbocharger and exhaust-gas purification device are located in back of the engine body in a vehicle longitudinal direction, and said master back is arranged behind the engine body on the side of said small-sized turbocharger and large-sized turbocharger in the crank-shaft direction.

3. The turbocharged engine for a vehicle of claim 2, wherein said exhaust pipe connecting to the exhaust outlet of the exhaust-gas purification device is stored in a saddle-shaped exhaust-pipe storage which is formed at a central position of a floor front portion of the vehicle so as to extend in the vehicle longitudinal direction in such a manner that a front end thereof opens in the engine room of the vehicle.

4. The turbocharged engine for a vehicle of claim 1, wherein a master back of a brake device and said engine body are arranged in an engine room in front of a vehicle compartment of the vehicle, said engine body is arranged laterally so that the crank-shaft direction matches an axel direction of the vehicle, said small-sized turbocharger, large-sized turbocharger and exhaust-gas purification device are located in back of the engine body in a vehicle longitudinal direction, and said master back is arranged behind the engine body on the side of said exhaust-gas purification device in the crank-shaft direction.

5. The turbocharged engine for a vehicle of claim 4, wherein said exhaust pipe connecting to the exhaust outlet of the exhaust-gas purification device is stored in a saddle-shaped exhaust-pipe storage which is formed at a central position of a floor front portion of the vehicle so as to extend in the vehicle longitudinal direction in such a manner that a front end thereof opens in the engine room of the vehicle.

6. The turbocharged engine for a vehicle of claim 1, wherein said engine body is arranged laterally so that the crank-shaft direction matches an axel direction of the vehicle, said small-sized turbocharger, large-sized turbocharger and exhaust-gas purification device are located in back of the engine body in a vehicle longitudinal direction, and said exhaust pipe connecting to the exhaust outlet of the exhaust-gas purification device is stored in a saddle-shaped exhaust-pipe storage which is formed at a central position of a floor front portion of the vehicle so as to extend in a vehicle longitudinal direction in such a manner that a front end thereof opens in an engine room of the vehicle.

7. The turbocharged engine for a vehicle of claim 1, wherein there is provided a bypass passage which introduces the exhaust gas flowing down through said upward-extending upper bifurcate portion of the upstream-side exhaust pipe to said exhaust-gas purification device, bypassing the turbine of said large-sized turbocharger, and valves are respectively provided in said upward-extending upper bifurcate portion of the upstream-side exhaust pipe and said bypass passage, the valves opening the respective upward-extending upper bifurcate portion and bypass passage when a temperature of the exhaust-gas purification device does not reach a specified active temperature capable to purify the exhaust gas.

8. The turbocharged engine for a vehicle of claim 7, wherein said small-sized turbocharger and said large-sized turbocharger are located so that said outlet of the exhaust manifold is positioned between the turbochargers.

\* \* \* \* \*